United States Patent
Murphy et al.

[11] Patent Number: 6,059,943
[45] Date of Patent: May 9, 2000

[54] COMPOSITE MEMBRANE SUITABLE FOR USE IN ELECTROCHEMICAL DEVICES

[75] Inventors: Oliver J. Murphy, Bryan; Alan J. Cisar, Cypress, both of Tex.

[73] Assignee: Lynntech, Inc., College Station, Tex.

[21] Appl. No.: 09/025,680

[22] Filed: Feb. 18, 1998

Related U.S. Application Data

[60] Provisional application No. 60/054,150, Jul. 30, 1997.

[51] Int. Cl.⁷ .................................................. C25B 13/00
[52] U.S. Cl. ................................ 204/296; 429/41; 429/42
[58] Field of Search .............................. 204/296; 429/41, 429/42

[56] References Cited

U.S. PATENT DOCUMENTS

| | | | |
|---|---|---|---|
| 4,024,036 | 5/1977 | Nakamura et al. | 204/129 |
| 4,804,592 | 2/1989 | Vanderborgh et al. | 429/33 |
| 5,082,472 | 1/1992 | Mallouk et al. | 55/16 |
| 5,334,292 | 8/1994 | Rajeshwar et al. | 204/59 R |
| 5,512,263 | 4/1996 | McIntyre | 423/584 |
| 5,523,181 | 6/1996 | Stonehart et al. | 429/192 |
| 5,599,614 | 2/1997 | Bahar et al. | 204/296 |
| 5,602,185 | 2/1997 | Stone et al. | 521/27 |
| 5,682,261 | 10/1997 | Takada et al. | 359/321 |

OTHER PUBLICATIONS

"Fuel Cell: Program and Abstracts," Nov. 1996, p. 590–595.

O. Savadogo and P.R. Roberge, eds., "New Materials for Fuel Cell and Modern Battery Systems II," Jul. 6–10, 1997, p. 298–308.

Q. Deng, Y. Hu, R.B. Moore, C.L. McCormick, and K.A. Mauritz, "Nafion/ORMOSIL Hybrids Via in Situ Sol–Gel Reactions," 1997, p. 36–44 no month available.

Paul Jerus and Abraham Clearfield, "Ionic Conductivity of Anhydrous Zirconium Bis (Monohydrogen Orthophosphate) and Its Sodium Ion Forms," 1982, p. 79–83 no month available.

Osamu Nakamura, Tero Kodama, Isao Ogino, Yoshizo Miyake, "High–Conductivity Solid Proton Conductors: Dodecamolybdophosphoric Acid and Dodecatungstophosphoric Acid Crystals," 1979, p. 17–18 no month available.

Sanjiv Malhotra and Ravindra Datta, "Membrane–Supported Nonvolatile Acidic Electrolytes Allow Higher Temperature Operation of Proton–Exchange Membrane Fuel Cells," Feb. 1997, L23–L26.

*Primary Examiner*—Bruce F. Bell
*Attorney, Agent, or Firm*—Streets & Associates; Jeffrey L. Streets

[57] ABSTRACT

The invention relates to novel inorganic-organic composite membranes especially useful as ionically conducting membranes in electrochemical devices. The composites consist of a polymeric matrix, which may or may not be an ionic conductor in its unfilled form, filled with an inorganic material having a high affinity for water, capable of exchanging cations such as protons, and preferably with a high cation mobility, either on its surface or through its bulk.

37 Claims, 6 Drawing Sheets

| | 3 | 4 | 5 | 6 | 7 | 8 | 9 | 10 | 11 | 12 | 13 Al | 14 Si | 15 P |
|---|---|---|---|---|---|---|---|---|---|---|---|---|---|
| | Sc | Ti | V | Cr | Mn | Fe | Co | Ni | Cu | Zn | Ga | Ge | As |
| | Y | Zr | Nb | Mo | Tc | Ru | Rh | Pd | Ag | Cd | In | Sn | Sb |
| | La | Hf | Ta | W | Re | Os | Ir | Pt | Au | Hg | Tl | Pb | Bi |

FIG. 5

◐, ● = Zr
○ = P (large)
o = O (small)
● = OH

COMPOSITE MEMBRANE SUITABLE FOR USE IN ELECTROCHEMICAL DEVICES

This non-provisional U.S. national application filed under 35 USC §111(a) claims, under 35 USC §119(e)(1), the benefit of the filing date of provisional U.S. application Ser. No. 60/054,150, filed Jul. 30, 1997 under 35 U.S.C. §111(b).

FIELD OF THE INVENTION

This invention relates generally to the field of ionically conducting separators. The invention particularly describes a novel inorganic-organic composite membrane especially useful as a proton conducting membrane for use in electrochemical devices, such as fuel cells.

BACKGROUND OF THE INVENTION

Conventional cation and proton conducting membranes typically comprise a sheet of a homogeneous polymer, a laminated sheet of similar polymers, or a blend of polymers. A variety of polymers have been demonstrated to be cation conductors and some of the membranes produced using these polymers are highlighted in Table 1. All of these membranes, with the exception of the Gore Select™ membrane, arc homogeneous polymers. The Gore Select™ membrane is a polymer blend.

TABLE I

Polymers Used as Ion Conductors

| Source | Name | Polymer Structure |
|---|---|---|
| DuPont | Nafion ® | Perfluoro side chains on a PTFE backbone |
| Dow | | Perfluoro side chains on a PTFE backbone |
| W. L. Gore | Gore Select ™ | Perfluoro side chains on a PTFE backbone in a matrix |
| Ballard | | Trifluorostyrene backbone, with derivatized side chains |
| Maxdem | Poly-X ™ | Polyparaphenylene backbone |
| DAIS Corp. | | Sulfonated side chains on a styrene-butadiene backbone |
| Assorted | | Sulfonated side chains grafted to PTFE and other backbones |

Figure 1:
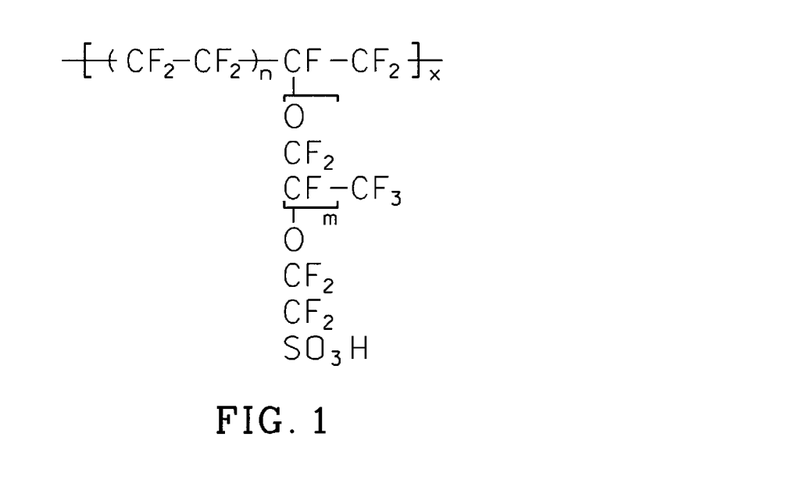
FIG. 1 is a schematic diagram of the structure of perfluorosulfonic acid (PFSA) polymers, as used in proton exchange membranes such as Nafion® 115 (n≈6.5 and m=1) and the Dow Chemical membrane (n≈6 and m=0).

Two of these materials, the membranes from DuPont and Dow, have relatively similar compositions and structures. These structures are illustrated in FIG. 1. Both of the polymers are perfluorosulfonic acids (PFSA's), which are solid organic super-acids, and both membranes are produced as homogeneous sheets. The active ionomer component of the Gore blend is also a PFSA material.

Figure 2:
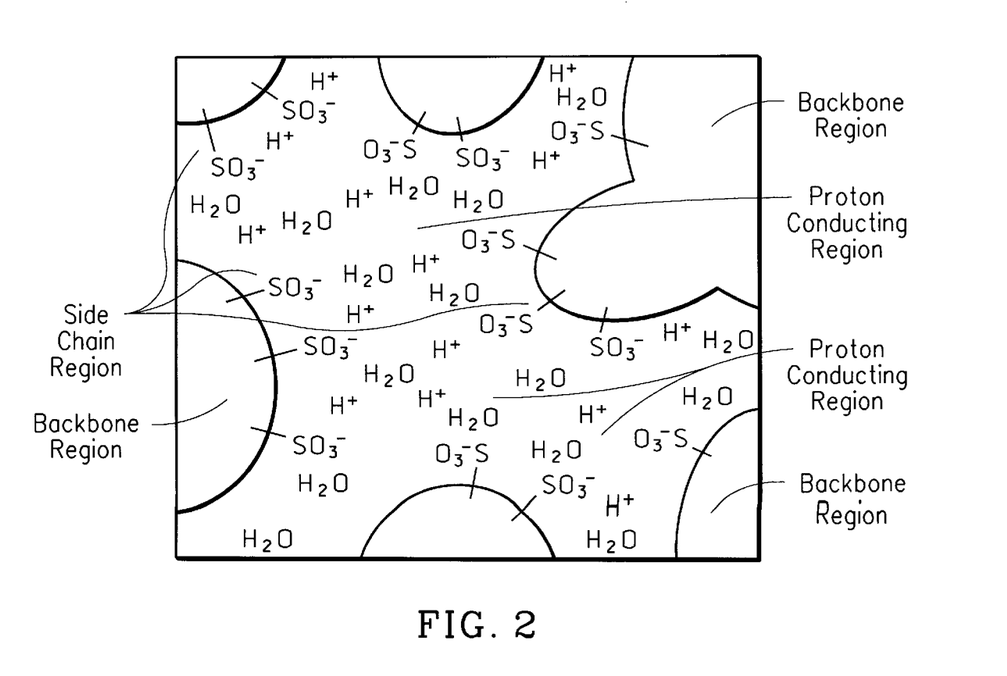
FIG. 2 is a schematic diagram illustrating the key features of a perfluorosulfonic acid (PFSA) membrane, i.e., a PTFE-like backbone phase separated from an ionic region that closely resembles an aqueous electrolyte by an interphase or side chain region.
Figure 3:
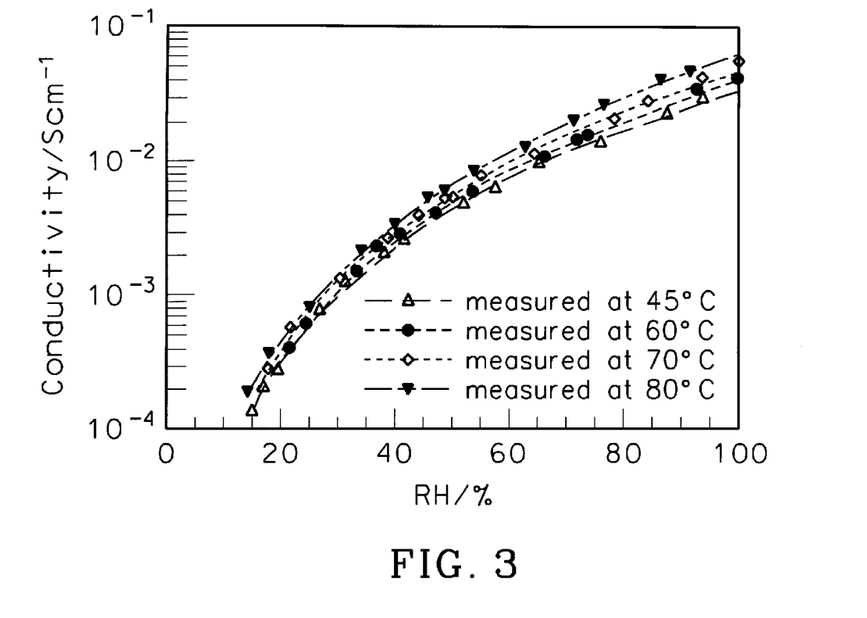
FIG. 3 is a graph of the conductivity of Nafion® as a function of moisture content measured at four temperatures.

All of those polymer materials rely on sulfonate functionalities ($R$—$SO_3$—) as the stationary counter charge for the mobile cations ($H^+$, $Li^+$, $Na^+$, etc.), which are generally monovalent. The most commonly proposed mechanism for this conduction, through essentially solvated cations, is illustrated in FIG. 2, which is a schematic drawing of the commonly proposed structure for perfluorosulfonic acid (PFSA) polymers, as typified by NAFION (a registered trademark of Dupont of Wilmington Delaware). One difficulty associated with this approach to cation conductivity is that the polymer membrane requires the presence of water for conductivity. As shown in FIG. 3 increasing water content increases conductivity at all temperatures. This dependence on water is the weak point of membranes that rely on sulfonic acid groups for their conductivity. As long as proton exchange membranes (PEM) membranes are kept hydrated, they function well, but when they dry out, resistance rises sharply.

The need for a PEM source of moisture besides the water generated at the cathode to maintain the amount of water in the membrane to maintain conductivity in PEM fuel cell membranes has been recognized for as long as PEM fuel cells have been known. A wide variety of methods have been developed to keep membranes supplied with water. These methods typically require adding water as either vapor or liquid to the gas streams entering the cell or adding water directly to the membrane.

There are a number of reasons that water is so easily lost from PEMs, even as it is being generated at the cathode. The vapor pressure of water over a saturated PEM is nearly as great as it is over pure water. This means that at a temperature of 100° C., a full atmosphere of water vapor is required to keep the membrane saturated.

The water carrying power of gaseous oxidizer streams are quite substantial. It is difficult to operate a fuel cell with an air flow of less than twice the amount required to supply a stoichiometric amount of air for oxidation of the fuel (commonly termed two-fold stoichiometry). If a fuel cell is operated at ambient pressure, operating at a temperature of 55° C. will result in the exiting air stream carrying all of the water produced by the cell at two-fold stoichiometry. Operating at temperatures above 55° C. with the same air flow will cause a PEM membrane to become progressively drier. Increasing the operating pressure of the cell or stack will permit operation at higher temperatures, but the price of higher pressure is increased parasitic power losses.

If a proton-conducting membrane could be developed with improved water retention or a reduced dependence on free moisture for proton conduction it would be possible to operate a proton conducting membrane fuel cell with less water, with no water, or at higher temperatures. This would provide simpler, lighter fuel cell stack designs.

Figure 4:
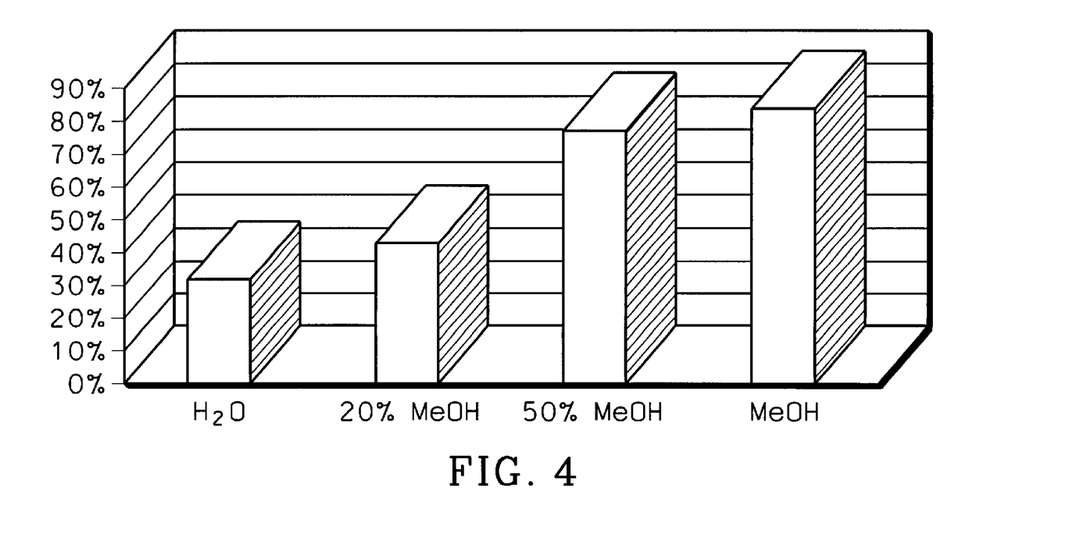
FIG. 4 is a bar graph showing the relative degree of swelling of Nafion® 115 in water, methanol, and selected water-methanol solutions. Swelling is defined as the gain in weight on exposure to the solvent for a fully dried specimen. All specimens were soaked in solvents at room temperature then equilibrated at 50° C. for 70 minutes.

There is a related problem that only applies to direct methanol fuel cells (DMFC's) which is referred to as "methanol crossover." Typical PFSA fuel cell membranes have a higher affinity for methanol than they do for water, as is clearly illustrated in FIG. 4. In a DMFC, the crossover process relates to the permeation of absorbed methanol through the membrane from anode to cathode. In general, it has been found that rate of methanol crossover through a PEM is proportional to the methanol concentration in the fuel feed stream. Therefore, a proton conducting membrane that requires less water to maintain its conductivity will also exhibit a reduced methanol flux.

Methanol crossover substantially impedes the performance of direct methanol fuel cells. First, methanol that crosses over represents lost fuel value and, therefore, a lower fuel efficiency. Furthermore, when that methanol arrives on the other side of the PEM, it is oxidized by the cathodic electrocatalyst which depolarizes the electrode. Oxidation of methanol at the cathode increases the amount of air, or oxygen, that the cell or stack requires, since a molecule of methanol oxidizing on the cathode requires the same 1½ molecules of oxygen ($O_2$) as one being consumed at the anode. Since none of the energy from this oxidation is being extracted as electricity, it all ends up as waste heat, increasing the cooling load on the cell. A proton conducting membrane with substantially reduced methanol crossover would represent a significant improvement in DMFC's.

Alternatives to polymer proton conductors include oxide proton conductors. A wide variety of metal oxides are proton conductors, generally in their hydrated or hydrous forms.

These oxides include hydrated precious metal containing oxides, such as RuOx (H$_2$O)$_n$ and (Ru—Ti)O$_x$(H$_2$O), acid oxides of the heavy post transition elements, such as acidic antimony oxides and tin oxides, and the oxides of the heavier early transition metals, such as Mo, W, and Zr. Many of these materials are also useful as mixed oxides. Some oxides which do not fit this description may be useful as well, such as silica (SiO$_2$) and alumina (Al$_2$O$_3$), although these are generally used as, or with, modifiers.

Figure 5:
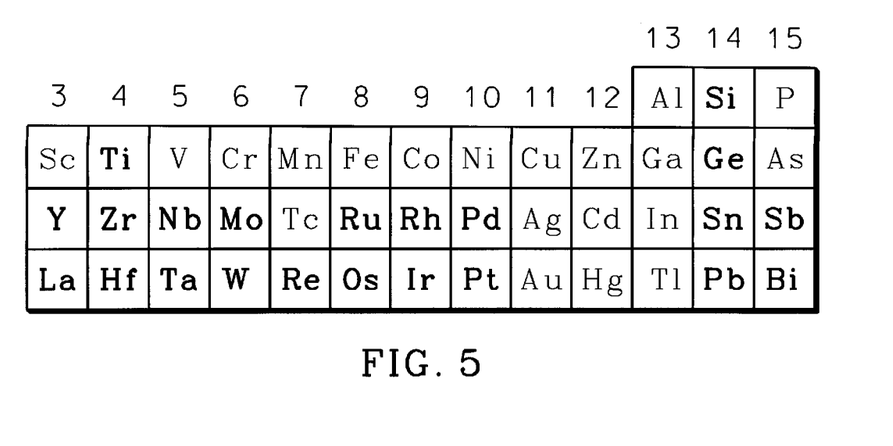
FIG. 5 is a section from the periodic table of the elements with those elements forming hydrous oxides potentially useful for forming composite membranes indicated in bold face type.

The number of metal oxides with the potential to serve as proton conductors is too large to fully discuss in detail here. This group, which can be summarized as those elements forming insoluble hydrated oxides that are not basic, includes not only known proton conductors, but oxide superacids that will furnish a multitude of free protons in the presence of an aqueous medium. These are shown in bold in FIG. 5. Many other elements which are not included in this list may be useful in conjunction with these elements as modifiers. An example of this is the inclusion of phosphorus in the structure of Keggin ions which consist primarily of a tungsten or molybdenum oxide framework. While the compounds encompassed in the description above have some degree of proton mobility, not all of those oxides have adequate proton mobility to be useful as components in composite membranes. Some particularly useful examples are discussed below.

Figure 6:
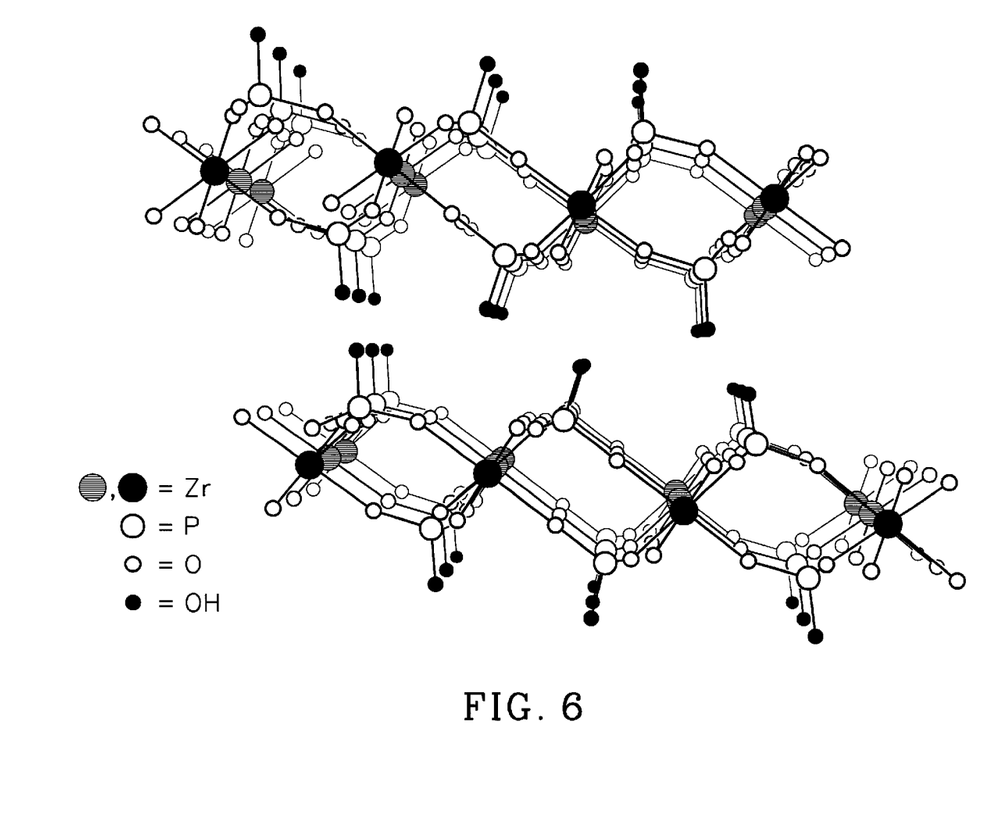
FIG. 6 is a diagram of the layered structure of α-zirconium phosphate.

Zirconium phosphate, specifically α-zirconium phosphate, whose structure is shown in FIG. 6, is known to be an excellent proton conductor when tested as a powder at ambient temperature. Under these conditions the compound is hydrated (Zr(HPO$_4$)$_2$(H$_2$O), and most of the conductivity is the result of protons migrating over the surface of the individual crystallites. Above 120° C. the water of hydration is lost and the conductivity drops substantially to a value representing the bulk conductivity of the solid, which increases from 1.42 $\mu$S at 200° C. to 2.85 $\mu$S at 300° C. With this combination of properties, α-zirconium phosphate is suitable for use in either low temperature (<100° C.) fuel cells, or in higher temperature (>150° C.) fuel cells.

This structure is not unique to α-zirconium phosphate. Hafnium, titanium, lead and tin all have phosphates that crystallize in this structure. These compounds have substantially less free volume in their structures than the zirconium compound, and are expected to show lower proton mobilities.

Tungsten and molybdenum offer two groups of proton conductors. The first of these groups are the simple, fully oxidized metals, as exemplified by tungsten trioxide (WO$_3$). This compound has been the subject of much interest due to its electrochromic properties. This oxide can be repeatedly electrochemically reduced in the solid state, with a color shift from light yellow to blue, and reoxidized back to the light yellow form. This property has been used to produce electrochromic windows that can be lightened and darkened as desired. This reaction occurs without any significant rearrangement of the crystal lattice. As a result, maintaining charge neutrality requires a cation (proton) to diffuse into the structure and reside on an interstitial site. By maintaining an appropriate bias across an oxide film, a proton flux can be maintained.

Figure 7:
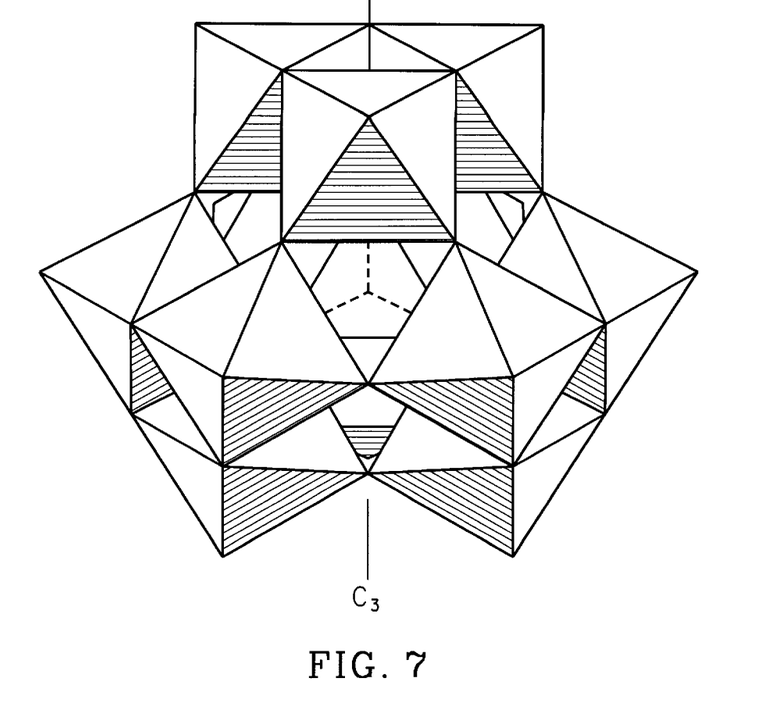
FIG. 7 is a diagram of the structure of a typical heteropolymolybdate, $(X^{n+}Mo_{12}O_{40})^{(8-n)-}$, a β-Keggin-type ion.

The second family of tungsten and molybdenum compounds demonstrated to have high protonic conductivity are the hetero⁻ and homo⁻ polymolybdates and polytungstates. This description encompasses a broad range of compounds with widely varying compositions, all of which are based on the fusion of groups of MO$_6$ (M=Mo, W) octahedra by edge or corner sharing. These ions (and they are all anions) have a generic formula of $(X^{k+}M_nO_{(3n+m)})^{(2m-k)-}$ where k is the positive charge of the heteroatom, if any, and m is the number of unshared octahedral corners in the structure. An example of a typical structure is illustrated in FIG. 7. The large cage in the center of the ion can host a heteroatom, such as P or As, which lowers the net charge on the ion. The exact structure formed is a function of temperature and pH, with interconversion between frameworks occurring with changing conditions.

The variety of compounds in this category continues to expand, with new compounds being synthesized and characterized regularly. Some of them, such as the (Mo$_{16}$V$_{14}$O$_{84}$)$^{14-}$ ion, have very complex structures.

Compounds in this family have been demonstrated to have room temperature proton conductivities as high as 0.17 S cm$^{-1}$ for H$_3$W$_{12}$PO$_{40}$*29 H$_2$O and 0.18 S cm$^{-1}$ for H$_3$Mo$_{12}$PO$_{40}$*29 H$_2$O (this is over an order of magnitude greater than the conductivity of Nafion® measured under the same conditions). These compounds have the thermal stability to remain proton conducting above 200 C, albeit with a reduced conductivity. Not only are these compounds proton conductors in their own right, but when silica gel is doped with H$_3$W$_{12}$PO$_{40}$*29 H$_2$O while it is being formed from tetraethoxysilane (TEOS) by a sol-gel reaction, then the product is an amorphous proton conductor with a conductivity that varies with the concentration of the tungstate, which may be present at up to about 50 percent by weight.

In one series of experiments, solutions of some of these acids were immobilized in polymer sheet matrices and the resulting electrolyte membrane used in a fuel cell operated at room temperature which showed good performance. However, the significant weakness of this approach is that the electrolyte is present as a liquid and, therefore, is subject to displacement out of the matrix if a pressure imbalance occurs.

In another series of experiments the acids were used in solid form, as either the pure acids, or in combination with a salt of the acid. In some cases a small amount (typically 0.5%) of a resin described as ethylene tetrafluoride powder was added to the acid. The addition of the resin improved the physical properties of the finished electrolyte, but even with this addition, membranes thinner than 2 mm could not be produced. The lower resistivity of the solid acid was not sufficient to overcome the resistive losses produced by a membrane nearly 16 times as thick as a typical polymer membrane (2 mm vs. 0.127 mm), and the resulting fuel cell exhibited poor performance. Tungsten oxides have also been used as electrocatalyst supports, and in this role have demonstrated an ability to enhance oxygen reduction for the platinum catalyst on the support.

Figure 8A:
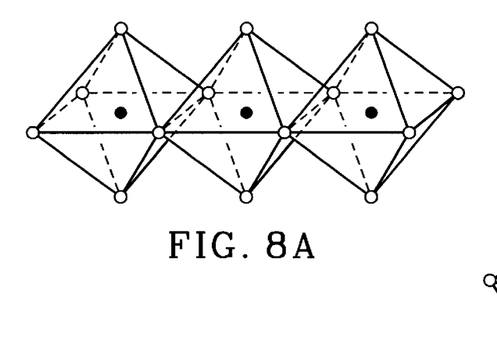
FIG. 8 is a diagram of the structure of two antimonic acid polymers, $H_3Sb_3O_4(OH)_{10}$ and $H_5Sb_5O_4(OH)_{22}$ (B).
Figure 8B:
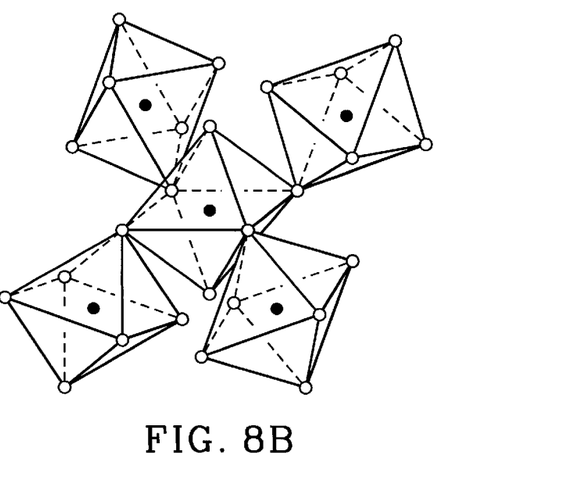

Another family of compounds that have been demonstrated to have high proton conductivity are the oxoacids of antimony. These compounds have a structure consisting of edge or corner shared SbO$_6$ octahedra, as shown in FIG. 8. Unshared oxygens are protonated (i.e., hydroxyls) and charge neutrality is maintained by exchangeable external cations. In these acids, antimony can be in either the +3 or +5 oxidation states, or a mixture of the two, depending on the synthesis conditions and subsequent treatment. The key step in the synthesis is the hydrolysis of SbCl$_5$, with or without hydrogen peroxide, generally carried out at 0° C. The more oxidizing the hydrolysis conditions, the larger will be the fraction of the antimony in the +5 oxidation state in the final product, and with a sufficiently oxidizing hydrolysis solution it is possible to obtain acids with all of the antimony in the +5 state. The acid precipitates as an insoluble white powder having a pyrochlore-type framework structure (based on cubic symmetry). The powder is thoroughly washed and dried at room temperature before further use.

Antimonic acids are dehydrated on heating in dry air, with most of the water lost at around 140° C. As long as the material is not heated above 200° C. it will reabsorb water from air, even under normal room conditions, and return to its original weight. Heating to temperatures above 300° C. lead to deoxygenation, with the $Sb^{+5}$ present reverting to $Sb^{+3}$.

Thin films of antimonic acid have been produced on conductive surfaces by electrophoretically depositing fine particles suspended in a solution of ammonium hydroxide in acetone. Although the resulting layers were shown by SEM to be smooth, no information was given on whether or not they were pore free, a requirement for this application.

Figure 9:
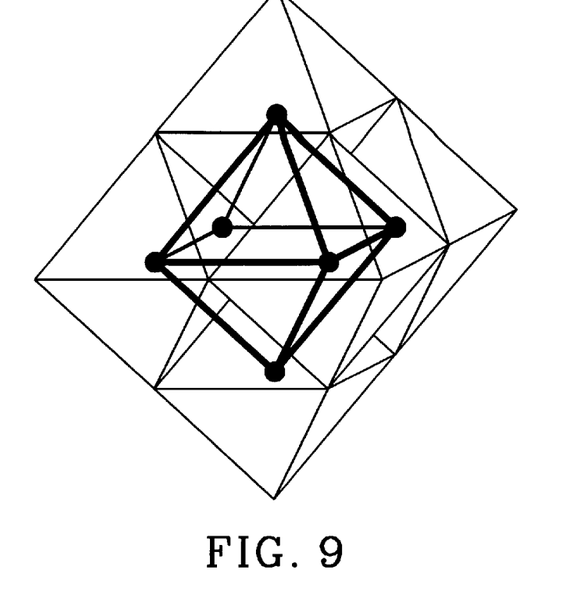
FIG. 9 is a diagram of the structure of the $M_6O_{19}^{8-}$ (M=Nb or Ta) anion.

Like tungsten and molybdenum, tantalum and niobium form highly charged complex polyanions, as illustrated in FIG. 9. These materials are also facile cation exchangers capable of proton conduction and subject to irreversible dehydration if heated above 100° C.

These families of inorganic ion exchangers have significant differences, but they also have three common features that make them candidates for use as proton conducting electrolytes in fuel cells. First, they all have easily exchangeable protons. Second, they all have open framework structures with channels to provide low resistance paths for the mobile protons to move along. Third, they all retain their proton conductivity at temperatures in excess of 200° C., and in most cases, in excess of 300° C. This last characteristic would appear to make it possible to use these compounds in fuel cells operating at slightly elevated temperatures, as well as at the same low temperatures (<100° C.) where conventional PEM fuel cells are used. Unfortunately, all of these oxide proton conductors are ceramic materials which are difficult to fabricate into thin, pin hole free, films.

Figure 10:
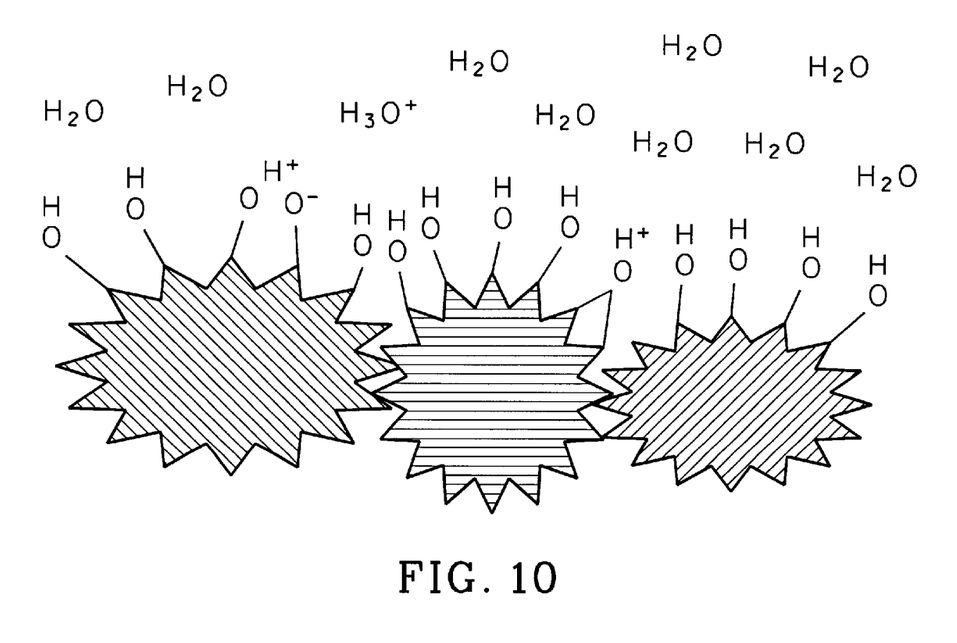
FIG. 10 is a schematic diagram of amorphous oxide particles with highly hydroxylated surfaces capable of supporting proton conduction over the surface.
Figure 11:
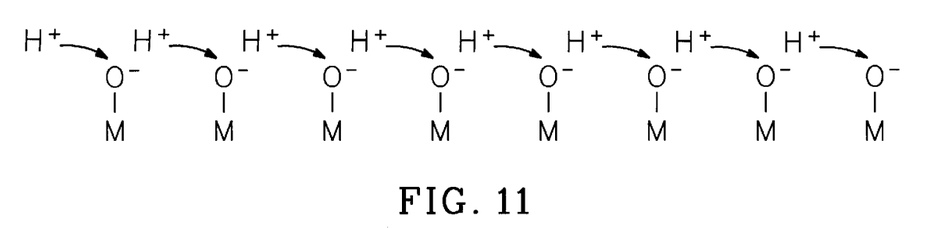
FIG. 11 is a schematic diagram of the Grothaus proton hopping mechanism for conductivity in an aqueous acid environment.

There are other inorganic compounds, with significantly different structures, which also offer a high degree of proton mobility. These inorganic compounds include solid superacids and oxides with highly hydrated surfaces as shown simplistically in FIG. 10. In both cases, the proton conductivity comes from protons diffusing over the surface of individual crystallites, or particles in the case of amorphous materials. This effect has already been described for fully hydrated α-zirconium phosphate. The Grothaus proton hopping occurring here is the same process that is presumed to account for the proton conductivity of PFSA membranes, polyphosphoric acid, and tungstic acid, as illustrated in FIG. 11.

Hydrated ruthenium oxides are one of the materials known to be capable of supporting a significant ionic current through the surface proton hopping mechanism described above. However, pure $RuOx (H_2O)_n$ would not be acceptable for use in electrolyte membranes since this compound is a metallic conductor. As such, it would electrically short circuit any cell in which it is used.

Ruthenium oxide "stuffed" Nafion® membranes have been tested as electrolyte membranes in direct methanol fuel cells and were demonstrated to reduce methanol crossover. Unfortunately, in this incarnation they were also found to reduce proton conductivity significantly.

A recently reported aerogel synthesis has been demonstrated to be particularly effective in generating proton conducting materials, largely because the products of this reaction have very high surface areas with a high degree of hydroxyl terminations and good electrical separation of local $RuO_x$ domains. $(Ru_{0.32}Ti_{0.68})O_2$ is a mixed conductor with both electrons and protons acting as charge carriers, and flowing in opposite directions. When normally synthesized as a bulk material, the majority of the current is carried by electrons. When the material is synthesized as an aerogel, with a greatly increased surface area, the majority of the charge is carried by protons. This is a clear demonstration of the surface protonic conductivity of RuO and a clear route to a way of utilizing it. The key to the aerogel process is keeping the widely dispersed sol-gel network, which is produced by the hydrolysis of a relatively dilute solution of metal alkoxides, separated as the solvent is removed. A similar effect can be harnessed in the production of membranes, as described in a later section of this disclosure.

Sulfated zirconia is an amorphous solid super acid that has recently received significant attention as an acid catalyst primarily for use in hydrocarbon conversions and as an acid support for other catalysts. Titanium oxides, and titanium-aluminum oxides, have been shown to have similar properties, but this discussion will focus on the better known zirconia compounds.

These materials are generally viewed as amorphous metal oxides with sulfate groups attached to their surface. They are produced by a variety of routes. The classical method is precipitation of amorphous $Zr(OH)_4$ by treating an aqueous solution of a zirconium salt with a base followed by sulfonation of the gel with either sulfuric acid or ammonium sulfate. The amorphous $Zr(OH)_4$ can also be produced by a sol-gel method, and sulfated in the same way. Both of these methods are essentially two-step syntheses. Higher surface area materials can be produced by the direct reaction of sulfuric acid with the alkoxide precursor. The catalyst is activated before use by calcination at temperatures between 400° and 650° C. Although these materials are strong Bronsted acids, like PFSA materials, they require water for the formation of free protons.

Solids with similar properties can also be produced with alumina ($Al_2O_3$) serving in place of zirconia. These materials are produced by combining a salt, such as $Li_2SO_4$ or $RbNO_3$, with the corresponding aluminum salt and sintering the mixture to convert the aluminum salt to an alumina matrix. The guest salt remains relatively unchanged. These materials can be pressed to form tablets about 1–2 mm thick, which were tested as fuel cell electrolytes. When operated at 400° C. they were found to produce promising results, with single cell potentials as high as 0.75 V observed at current densities of 200 mA/cm$^2$. The conductivity was attributed to protons moving along sites formed by the salt in the alumina matrix based on IR evidence of H—$SO_4$ coordination in the lithium containing electrolyte. However, because of the high temperature required for conductivity, these materials are not considered promising for use in a polymer bonded system.

All of the oxides described above are potentially useful as proton conductors, if they could be fabricated into sufficiently thin sheets that the conductivity would be similar to conventional polymeric membranes. The inability to produce thin sheets is a key weakness of materials produced by the approach or method used by Nakamora et al. (U.S. Pat. No. 4,024,036.)

In addition to inorganic cation conductors, inorganic-organic composite membranes are potentially useful for electrochemical applications. PFSA membranes, such as Nafion®, have been filled with 12-phosphotungstic acid ($H_3W_{12}PO_{40}$), an inorganic proton conductor. These membranes have been demonstrated to have better water retention and, consequently, better conductivity at temperatures above 100° C. than the same membranes in their unfilled form. The goal was to develop membranes for PEM fuel cells that could be operated at elevated temperatures to ameliorate the problem of CO poisoning for anode electrocatalysts. The addition of 12-phosphotungstic acid to the polymer electrolyte permitted operation at temperatures up to 120° C., but no evidence was shown for improved CO tolerance.

In U.S. Pat. No. 5,523,181, Stonehart et al. describe a composite membrane useful for PEM fuel cells consisting of high surface area silica, preferably in the form of fibers, as a filler with a variety of polymers capable of exchanging cations with solutions as the matrix. These membranes are produced by suspending the inorganic phase in a solvent appropriate for the dissolution of the polymer and blending the suspension with a solution of the polymer in the same solvent. Membranes are formed by evaporating the solvent in a controlled manner to produce a thin film of the composite. The silica is selected to maximize its affinity for water and ability to retain water. They demonstrate reduced electrical resistance in fuel cells operating under conditions of low humidification. The improved performance is attributed to improved water retention by the silica, and improved back diffusion of water from the cathode to the anode along the silica fibers with the back diffusing water replacing water removed by electroosmotic transport. They have not attributed any contribution to the overall proton conductivity to the silica.

In U.S. Pat. No. 5,512,263, McIntyre describes a composite membrane produced using an ionically conductive polymer together with an electrically conductive filler phase. This membrane permits the construction of an internally shorted fuel cell, which is described as useful for the synthesis of hydrogen peroxide. Since all of the electrical current flows internally within the membrane, there is no external electrical control or monitoring of the reaction. This lack of control may contribute to the relatively low efficiency of their process.

In U.S. Pat. No. 5,682,261, Takada et al. disclose a three phase system for producing a composite membrane. A Brønsted acid, typically a strong mineral acid is adsorbed onto the surface of finely divided silica and this mixture is combined with a thermoplastic binder to produce a proton conducting membrane. In this membrane the primary conductivity is due to free protons in the acid. This membrane has been found to be useful as an ion conductor for electrochromic windows and for fuel cells.

In U.S. Pat. No. 5,334,292, Rajeshwar et al. describe a composite consisting of an electron conducting polymer (as opposed to an ion conducting electrolyte) and catalytically active metal particles. The polymers they use are polypyrrole and polyanaline which are polymerized electrochemically on a conductive surface. This composite is described as being useful as a supported electrocatalyst where it is desirable to suspend precious (e.g., Pt, Pd, Ag, Ru, etc.) electrocatalytically active particles in an inexpensive conductive matrix to minimize the amount of precious metal used.

Inorganic-organic composite membranes may also be useful for a variety of other applications. These composites may include a Nafion® matrix and a semiconductor filler, where the semiconductors generally selected are those known to show activity for carrying out photocatalytic reactions, such as CdS, CdSe, $FeS_2$, ZnS, $TiO_2$, and $Fe_2O_3$. The composites produced are useful for carrying out reactions such as the photocatalytic decomposition and oxidation of organic compounds and even the fixation of nitrogen.

In their article entitled "Nafion/ORMOSIL Hybrids via in Situ Sol-Gel Reactions. 3. Pyrene Fluorescence Probe Investigations of Nanoscale Environment," (*Chemistry of Materials*, 9, 36–44, (1997), Mauritz et al. describe PFSA-silica composites by the hydrolysis of tetraethoxysilane (TEOS) inside the polymer matrix. The inorganic-organic ratio can be varied over a wide range, as can the properties of the inorganic phase, permitting the properties of the final composite to be tailored for specific applications. These composite materials have been demonstrated to have improved selectivity for gas separation when compared to the unfilled polymer. Mauritz et al. have also demonstrated the ability to produce nanophase composites with $TiO_2$, titaniasilicate, and aluminasilicate inorganic phases.

A number of authors have described PFSA membranes filled with transition metal complexes. Compounds used in this way have included complexes of ruthenium, rhodium, palladium, silver, rhenium, iron, and manganese. In these composites, the polymer serves to immobilize and stabilize the ionic or molecular species, which continues to exist in essentially the same form as it does in solution. These complexes usually serve as catalysts, with the transition metal species serving the same function as it does when used as a homogeneous catalyst, but with improved catalyst life and recoverability. In the case of silver, the filled membrane was found to have improved selectivity for separation of dienes from monoenes. While these materials are sometimes described as composites, they are more accurately described as immobilized homogeneous catalysts with a polymer as the support.

Therefore, there is a need for ionically conducting materials or composites exhibiting high cation conductivity and reduced dependence on water. It would be desirable if these materials or composites performed well not only at temperatures below about 100° C., but also above about 150° C. or more. It would also be desirable if the materials or composites were suitable for use as PEMs in fuel cells, particularly in fuel cells using reformate fuels which may contain carbon monoxide.

SUMMARY OF THE INVENTION

The present invention provides a cation-conducting composite membrane comprising an oxidation resistant polymeric matrix filled with inorganic oxide particles forming a connected network extending from one face of the membrane to another face of the membrane. In many applications, the cations will comprise protons. The inorganic oxide particles may comprise a hydrated metal oxide, preferably wherein the metal is selected from molybdenum, tungsten, ziroconium and mixtures thereof, and most preferably wherein the inorganic oxide particles are selected from heteropolytungstates, heteropolymolybdates, zirconium phosphates, and mixtures thereof. The polymeric matrix is preferably a synthetic organic polymer having a melting point greater than about 300° C., such as polymers selected from fully halogenated polymers, partially halogenated polymers, and mixtures thereof. The preferred synthetic organic polymers are selected from perfluorosulphonic acid, polytetrafluoroethylene, perfluoroalkoxy derivative of PTFE, polysulfone, polymethylmethacrylate, silicone rubber, sulfonated styrene-butadiene copolymers, polychlorotrifluoroethylene (PCTFE), perfluoroethylenepropylene copolymer (FEP), ethylene-chlorotrifluoroethylene copolymer (ECTFE), polyvinylidenefluoride (PVDF), copolymers of polyvinylidenefluoride with hexafluoropropene and tetrafluoroethylene, copolymers of ethylene and tetrafluoroethylene (ETFE), polyvinyl chloride, and mixtures thereof, with the most preferred halogenated polymers being the fluorinated polymers and blends of these polymers.

The cation-conducting composite membranes of the present invention may be made by several processes of impregnating an inorganic oxide proton conductor into the pores of a porous polymer matrix. One method includes impregnating the precursor to an oxide proton conductor into the pores of a porous polymer matrix; and then converting the precursor material into the desired proton conducting oxide. Another method includes precipitating a mixture of the ion conducting oxide and a polymer matrix from solution and pressing the precipitate into a membrane. Yet another method includes converting a soluble precursor to a proton conductive metal oxide to the insoluble oxide in an aqueous solution containing an emulsion or suspension of a polymer and simultaneously precipitating the polymer and the metal oxide. A further method includes providing a suspension of a suitable inorganic proton conductor in a solution, forming a matrix polymer within the solution, separating the solids from the solution, and pressing the solids into a composite membrane. One method includes producing a suspension containing both the matrix polymer and the oxide proton conductor, filtering the matrix polymer and the oxide proton conductor onto a removable filter element, removing the filtered mass from the removable filter element, and pressing the filtered mass to form composite membrane. The pressing may occur with heat and may occur between two rollers. The pressed membrane should exhibit good mechanical properties, such as flexibility, and be essentially gas impermeable. The filling of the inorganic matrix may be conducted so that the distribution of the oxide in the matrix may be either homogeneous or heterogeneous. In a homogeneous filling, all portions of the matrix may comprise essentially equivalent quantities of the oxide, while in a heterogeneous filling, some portions of the matrix may comprise more oxide than other portions of the matrix. In heterogenous fillings, it is possible that some portions of the matrix may comprise little oxide or no oxide at all. Finally, another method includes using a porous polymer matrix as a filter element, and filling the pores in the porous polymer matrix with an oxide proton conductor by filtering a suspension of the oxide into it.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The invention provides a composite membrane consisting of an inorganic component, active for the conduction of protons or other cations, bound together by a polymeric binder phase, which may, or may not, be an ionic conductor. This membrane requires a sufficient fraction of the inorganic phase to insure connectivity from one surface of the membrane to the opposing surface. It also requires a sufficient fraction of the polymer phase to produce good barrier properties to prevent mass transport through the membrane and to impart a degree of flexibility to the membrane.

Figure 12:
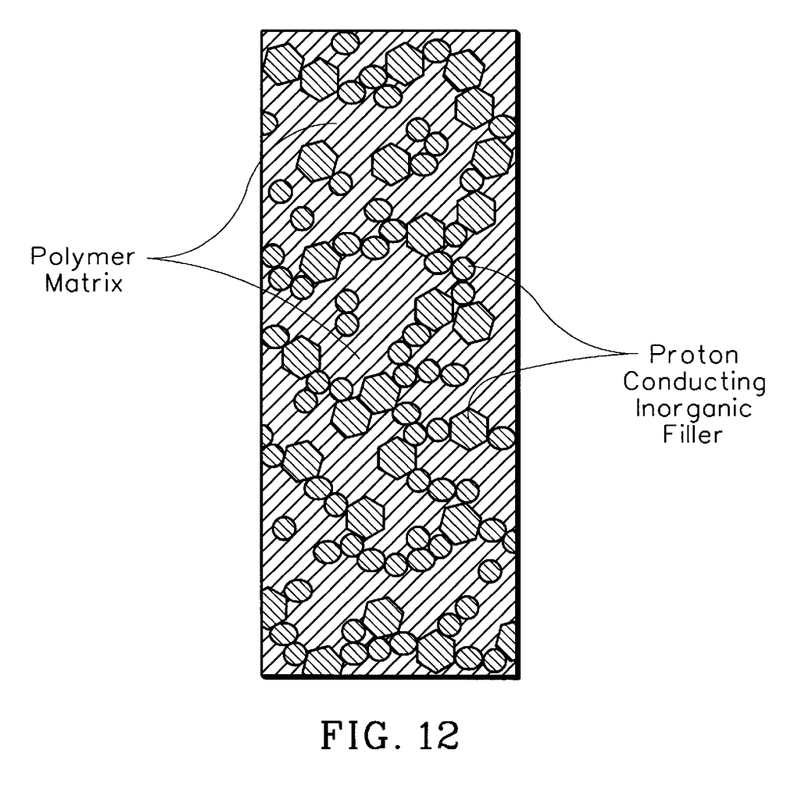
FIG. 12 is a cross-section view of an ion conducting membrane produced according to the teachings of the present invention.

The inorganic component forms a connected network, shown in FIG. 12, penetrating from one face of the membrane to the other face of the membrane to permit ionic conduction from face to face. As can be seen in FIG. 12, it is likely that not every particle will be in contact with other particles, or that every chain of particles will extend completely through the membrane. In order to insure as many particle-to-particle contacts as possible, it is important that the volume fraction of the inorganic phase be as large as possible, without sacrificing the barrier properties of the membrane with the membrane having a Gurley number greater than 10,000 seconds.

The oxide components suitable for use in the composite membranes of the present invention are described in the background section above. The polymer matrix used is equally important, and there are a variety of materials available to fill this role. Some of these, together with some of their advantages, are summarized in Table II.

TABLE II

Polymers Useful for Forming Composite Membranes

| Polymer | Name | Advantages |
| --- | --- | --- |
| Perfluorosulfonic acid (PFSA) | Nafion ® | Resistant to oxidation and a cation conductor. |
| Polytetrafluoroethylene (PTFE) | Teflon ® | Resistant to oxidation |
| Perfluoroalkoxy derivative of PTFE (PFA) | | Resistant to oxidation |
| Poysulfone | | Good temperature resistance |
| Polymethylmethacrylate (PMMA) | | Easily formed, inexpensive |
| Silicone rubber | | Easily fabricated |
| Polyvinyl chloride (PVC) | | Thermoplastically formed |

Perfluorinated materials, such as PTFE and PFA, have several distinct advantages for this application. The primary advantage of these is their near total resistance to oxidation. Some electrochemical applications involve relatively mild conditions, but one of the largest potential applications, PEM fuel cells exposes the electrolyte membrane to extremely oxidizing conditions. Not only is one side of the membrane exposed to air at elevated temperatures, but the fuel cell reactions themselves produce trace levels of hydrogen peroxide and peroxyl radicals. Both of these are extremely powerful oxidizers which readily attack hydrocarbons and partially halogenated polymers.

A second advantage is a relatively high melting point. With melting points in excess of 300° C., these materials are suitable for service at temperatures up to 250° C.

PFSA polymers are perfluorinated for oxidation resistance, and are also ion conducting polymers. These have already been demonstrated to be effective matrices for the formation of composites. These polymers also have a strong affinity for water and consequently, undergo a significant change in size with changing water activity. Not only do they change size with water activity, but, as shown in FIG. 3, when water activity declines, so does the polymer's ionic conductivity. Even at moderately elevated temperatures, just above 100° C., a water pressure in excess of one atmosphere is required to keep the polymer ionically conductive.

Polysulfone is a thermoplastic with excellent heat resistance and a high heat deflection temperature (150° C.). Composite membranes made with a polysulfone matrix have higher maximum service temperatures than those with PFSA matrices and are less subject to creep than those made with PTFE matrices.

Other polymers, such as polymethylmethacrylate, silicone rubber, and polyvinyl chloride, are also useful, with each having its own useful properties. Regardless of which polymer is used as the matrix, it is important that the polymer remain flexible under fuel cell operating conditions, and that any size change that occurs with changing conditions be relatively small.

There are other polymers not listed above which could be used in the same manner as those described here. The selection and use of other polymers as the binder phase to produce membranes in accordance with the present invention may be readily recognized by one skilled in the art.

The composite membranes of the present invention may be made in a variety of ways. These include, but are not limited to, the following:

1) Impregnating an oxide proton conductor into the pores of a porous polymer matrix. This is the most direct method.
2) Impregnating the precursor to an oxide proton conductor into the pores of a porous polymer matrix and then converting the precursor material into the desired proton conducting oxide. An example of this method is the impregnation of a porous, expanded sheet of polytetrafluoroethylene (PTFE) sold under the tradename GORETEX (W.L. Associates, Inc., Elkton Md.) or the tradename TETRATEX (Tetratec, Seasterville, Pa.) having pores in the range of 0.005–3 μm in diameter with a concentrated metal alkoxide solution, followed by hydrolysis to produce the desired hydrated oxide and drying to remove excess water. If the solubility or solubilities of the metal alkoxides are insufficient for a single deposition cycle to deposit enough metal oxide to support ionic conductivity or to render the membrane essentially impermeable to gas flow, the metal oxide content can be increased after drying by repeating the deposition and hydrolysis process.
3) Precipitating a mixture of the ion conducting oxide and the polymer binder from an aqueous solution and fabricating the resulting product into a membrane.
4) Converting a precursor to a proton conductive metal oxide to the oxide in aqueous solution containing an emulsion or suspension of the polymer and simultaneously precipitating the polymer along with the oxide.
5) Carrying out the solution polymerization of a polymer suitable for use as the binder phase of the composite membrane in a suspension of a suitable inorganic proton conductor, separating the solids from the solution and producing a composite membrane.
6) Producing a suspension containing both the desired polymer binder and the oxide proton conductor, then filtering the suspension onto a removable filter element to produce the desired membrane.
7) Using a porous polymer filter element as the polymer phase, and filling the pores in the filter with the desired oxide proton conductor by filtering a suspension of the oxide into it. An example of this is the vacuum filtration of an amorphous zirconium phosphate gel into a porous, expanded polytetrafluoroethylene (PTFE) filter element followed by crystallization of α-zirconium phosphate by refluxing the membrane in phosphoric acid.
8) Filling the pores of a porous polymer membrane with a concentrated solution of the precursor to the desired oxide, with a reservoir of precursor solution on one side and precipitating the oxide phase in the pores of the filter by placing an appropriate reactive solution on the other side, with the reaction occurring inside the membrane as the components diffuse together. An example of this is the precipitation of a hydrous oxide from an acidic metal salt solution by raising the pH through the use of a basic solution.

There are two primary methods for synthesizing the oxide proton conductors described here. The most common route is base hydrolysis of soluble metal chlorides, metal nitrates or other metal salt solutions. Most transition metal chlorides and nitrates are soluble in acid. When the solution pH is raised by the addition of base, the metal precipitates as hydroxide. Further processing, by either calcination or hydrothermal treatment, converts the hydroxide to the oxide.

The second route is the sol-gel route. In this process a metal hydroxide gel is formed by slowly adding small amounts of water to a solution of the metal alkyl or alkoxide in a hydrocarbon (or other unreactive organic) solvent. The water reacts to form alkanes (from alkyls) or alcohols (from alkoxides) and a dispersed metal hydroxide gel. This gel can be consolidated by aging or converted to an oxide by hydrothermal treatment or calcination.

There are several important considerations when processing proton conducting metal oxides that apply to any approach for membrane fabrication. The first of these is temperature sensitivity. Most of the inorganic oxides discussed here lose all, or part, of their proton conductivity if heated to too high a temperature in the absence of water. The details of how a number of these compounds behave when heated were discussed in the background section. Both $Zr(HPO_4)_2 \cdot H_2O$ and $H_3W_{12}PO_{40} \cdot 29\ H_2O$ are proton conductors at elevated temperatures (>200° C.) as well at lower temperatures (~60–100° C.), but both are better conductors at low temperatures than at high temperatures and both, if annealed at temperatures above 300° C., will be transformed irreversibly to the lower conductivity form.

The second broad consideration is cleanliness in the sense that the oxide needs to be as free as possible of free anions, especially halides such as chlorides. Halides are known to poison precious metal catalysts, such as platinum which is frequently used in fuel cells. Even small amounts of free anions can cause severe problems, since the same electric field that causes protons to migrate from anode to cathode will cause any free anions present to migrate toward the anode, potentially poisoning the electrocatalysts.

The following examples show the function of this invention and some of its preferred embodiments.

EXAMPLE 1

(This example illustrates the preparation of a composite membrane.)

A porous polytetrafluoroethylene (PTFE) filter is placed in a filtration funnel, a suspension of gelatinous zirconium phosphate produced by the rapid addition of a solution of $Zr(NO_3)_4 \cdot 5\ H_2O$ to 85% phosphoric acid is placed in the funnel, and a vacuum applied to the outlet of the funnel. Fluid moves through the pores in the filter, but the gelatinous zirconium phosphate is retained, rapidly filling the pores and bringing the filtration to a stop after about 10 minutes. At the point the vacuum is released, that portion of the original suspension which has not yet passed into the filter is decanted, and the filter transferred to a boiling flask containing 85% phosphoric acid. A condenser is placed on top of the flask and the flask heated until the acid reaches reflux.

The heating is continued for seven days to crystallize the gel into $\alpha$—$Zr(HPO_4)_2 \cdot H_2O$. After the flask cools, the acid is decanted and the membrane is removed. Since the crystalline phosphate occupies less volume than the amorphous gel, there is now pore volume open in the membrane. To insure the complete filling of the pores, the filtration step is repeated, followed by the reflux step. The resulting membrane is washed in deionized water to remove any free phosphoric acid.

The composite membrane fabricated above may be submitted to a Gurley air flow test to determine its gas permeability properties. The Gurley air flow test measures the time in seconds for 100 mL of air to flow through a one square inch sample at 4.88 inches of water pressure. The sample is measured in a Gurley Densometer (ASTM 0276-58). The sample is placed between the clamp plates. The cylinder is then dropped gently. The automatic timer (or stopwatch) is used to record the time (seconds) required for a specific volume recited above to be displaced by the cylinder. This time is the Gurley number.

EXAMPLE 2

(This example illustrates the use of a composite membrane.)

A membrane produced by the method described in Example 1 is placed between two standard gas diffusion electrodes, the surfaces of which have been catalyzed with carbon (Vulcan XC-72R) supported platinum (30 wt %) at a loading of 2 mg $Pt/cm^2$ and the entire assembly placed in a standard fuel cell testing apparatus. Hydrogen is supplied to one electrode (the anode) and air to the opposite electrode (the cathode) and the resulting cell operated as a fuel cell for the generation of electricity.

While the foregoing is directed to the preferred embodiment of the present invention, other and further embodiments of the invention may be devised without departing from the basic scope thereof, and the scope thereof is determined by the claims which follow.

What is claimed is:

1. A cation-conducting, essentially gas impermeable composite membrane, comprising a polymeric matrix filled with inorganic oxide cation exchange particles forming a connected network extending from one face of the membrane to another face of the membrane.

2. The membrane of claim 1, wherein the cation is selected from protons, lithium ions, or sodium ions.

3. The membrane of claim 1, wherein the inorganic oxide cation exchange particles comprise at least one hydrated metal oxide.

4. The membrane of claim 3, wherein the hydrated metal oxide contains a metal selected from molybdenum, tungsten, zirconium, titanium, ruthenium, or mixtures thereof.

5. The membrane of claim 3, wherein the inorganic oxide cation exchange particles are selected from heteropolytungstates, heteropolymolybdates, complex polyanions of tantalum and niobium, zirconium phosphates, hafnium phosphates, lead phosphates, tin phosphates, antimonic oxoacids, or mixtures thereof.

6. The membrane of claim 1 wherein the polymeric matrix comprises an oxidation resistant polymer material.

7. The membrane of claim 1, wherein the polymeric matrix is a synthetic organic polymer having a melting point greater than about 100° C.

8. The membrane of claim 1, wherein the polymeric matrix is a synthetic organic polymer having a melting point greater than about 200° C.

9. The membrane of claim 1, wherein the polymeric matrix is a synthetic organic polymer having a melting point greater than about 300° C.

10. The membrane of claim 1, wherein the polymeric matrix is a synthetic organic polymer selected from fully halogenated polymers, partially halogenated polymers, or mixtures thereof.

11. The membrane of claim 10, wherein the halogen is selected from fluorine, chlorine, or mixtures thereof.

12. The membrane of claim 1 wherein the polymeric matrix is a synthetic organic polymer selected from perfluorosulphonic acid, polytetrafluoroethylene, perfluoroalkoxy derivatives of polytetrafluoroethylene, polysulfone, polymethylmethacrylate, silicone rubber, sulfonated styrene-butadiene copolymers, polychlorotrifluoroethylene (PCTFE) perfluoroethylene-propylene copolymer (FEP), ethylene-chlorotrifluoroethylene copolymer (ECTFE), polyvinylidenefluoride (PVDF), copolymers of polyvinylidenefluoride with hexafluoropropene and tetrafluoroethylene, copolymers of ethylene and tetrafluoroethylene (ETFE), polyvinyl chloride, or mixtures thereof.

13. The membrane of claim 1, wherein the inorganic oxide cation exchange particles form the connected network.

14. The membrane of claim 1, wherein the polymeric matrix is non-conducting.

15. The membrane of claim 1, wherein the membrane has a Gurley number greater than 10,000 seconds.

16. The membrane of claim 1, wherein the inorganic oxide cation exchange particles are selected from the oxides of molybdenum, tungsten, ziroconium, titanium, ruthenium, or mixtures thereof.

17. The membrane of claim 1, wherein the inorganic oxide cation exchange particles are proton conducting.

18. The membrane of claim 1, wherein the inorganic oxide cation exchange particles are characterized by open framework structures with channels for proton conduction.

19. The membrane of claim 1, wherein the inorganic oxide cation exchange particles are characterized by maintaining proton conductivity at temperatures in excess of 200° C.

20. The membrane of claim 1, wherein the inorganic oxide cation exchange particles comprise at least one oxide superacid or oxides with highly hydrated surfaces.

21. The membrane of claim 20, wherein the oxide superacid is selected from sulfated zirconia, sulfated alumina, sulfated titanium oxide, or sulfated titanium-aluminum oxide.

22. A cation-conducting, essentially gas impermeable composite membrane, comprising: a polymeric matrix filled with cation-conducting material, wherein the polymeric matrix is formed by a blend of two or more synthetic organic polymers, and wherein the cation-conducting material forms a connected network extending from one face of the polymeric matrix to another face of the polymeric matrix.

23. The membrane of claim 22, wherein the two or more synthetic organic polymers each have a melting point of greater than about 100° C.

24. The membrane of claim 22, wherein each of the two or more synthetic organic polymers are selected from polytetrafluoroethylene (PTFE), perfluoroalkoxy derivatives of PTFE, polysulfone, polymethylmethacrylate, silicone rubber, sulfonated styrene-butadiene copolymers, polychlorotrifluoroethylene (PCTFE), perfluoroethylene-propylene copolymer (FEP), ethylene-chlorotrifluoroethylene copolymer (ECTFE), polyvinylidenefluoride (PVDF), copolymers of polyvinylidenefluoride with hexafluoropropene and tetrafluoroethylene, copolymers of ethylene and tetrafluoroethylene (ETFE), polyvinyl chloride, and mixtures thereof.

25. The membrane of claim 22, wherein the membrane has a Gurley number greater than 10,000 seconds.

26. The membrane of claim 22, wherein the cation-conducting material is an organic ion exchange material.

27. The membrane of claim 26, wherein the organic ion exchange material is selected from perfluorosulfonic acid, perfluorocarboxylic acid, or combinations thereof.

28. The membrane of claim 22, wherein the cation-conducting material is an inorganic ion exchange material.

29. The membrane of claim 28, wherein the inorganic ion exchange material is selected from heteropolytungstates, heteropolymolybdates, complex polyanions of tantalum and niobium, zirconium phosphates, hafnium phosphates, lead phosphates, tin phosphates, antimonic oxoacids, or mixtures thereof.

30. The membrane of claim 22, wherein the cation-conducting material includes an inorganic ion exchange material and an organic ion exchange material.

31. A cation-conducting, essentially gas impermeable composite membrane, comprising: a synthetic organic polymer matrix filled with cation-conducting material, wherein the cation-conducting material includes an inorganic cation-conducting material and an organic cation-conducting material, and wherein the cation-conducting material forms a connected network extending from one face of the polymeric matrix to another face of the polymeric matrix.

32. The membrane of claim 31, wherein the synthetic organic polymer matrix has a melting point of greater than about 100° C.

33. The membrane of claim 31, wherein the synthetic organic polymer matrix is formed by a polymer selected from polytetrafluoroethylene (PTFE), perfluoroalkoxy derivatives of PTFE, polysulfone, polymethylmethacrylate, silicone rubber, sulfonated styrene-butadiene copolymers, polychlorotrifluoroethylene (PCTFE), perfluoroethylene-propylene copolymer (FEP), ethylene-chlorotrifluoroethylene copolymer (ECTFE), polyvinylidenefluoride (PVDF), copolymers of polyvinylidenefluoride with hexafluoropropene and tetrafluoroethylene, copolymers of ethylene and tetrafluoroethylene (ETFE), polyvinyl chloride, and mixtures thereof.

34. The membrane of claim 31, wherein the membrane has a Gurley number greater than 10,000 seconds.

35. The membrane of claim 31, wherein the organic cation conducting material is selected from perfluorosulfonic acid, perfluorocarboxylic acid, or combinations thereof.

36. The membrane of claim 31, wherein the inorganic cation conducting material is selected from heteropolytungstates, heteropolymolybdates, complex polyanions of tantalum and niobium, zirconium phosphates, hafnium phosphates, lead phosphates, tin phosphates, antimonic oxoacids, or mixtures thereof.

37. A cation-conducting, essentially gas impermeable composite membrane, comprising a polymeric matrix filled with inorganic oxide cation exchange particles forming a connected network extending from one face of the membrane to another face of the membrane, wherein the polymeric matrix is a blend of at least two synthetic organic polymers.

* * * * *